(12) United States Patent
Overbeek et al.

(10) Patent No.: US 7,247,671 B2
(45) Date of Patent: Jul. 24, 2007

(54) AQUEOUS CROSSLINKABLE COATING COMPOSITIONS BASED ON VINYL FLUOROPOLYMER

(75) Inventors: Gerardus Cornelis Overbeek, Holland (NL); Jurgen Scheerder, Holland (NL); Tijs Nabuurs, Holland (NL)

(73) Assignee: DSM IP Assets B.V., Heerien (NL)

( * ) Notice: Subject to any disclaimer, the term of this patent is extended or adjusted under 35 U.S.C. 154(b) by 1 day.

(21) Appl. No.: 10/485,572

(22) PCT Filed: Jul. 22, 2002

(86) PCT No.: PCT/GB02/03365

§ 371 (c)(1),
(2), (4) Date: Feb. 3, 2004

(87) PCT Pub. No.: WO03/016412

PCT Pub. Date: Feb. 27, 2003

(65) Prior Publication Data

US 2005/0004300 A1    Jan. 6, 2005

(30) Foreign Application Priority Data

Aug. 14, 2001   (GB) .................................. 0119728.4

(51) Int. Cl.
 *C08F 8/00* (2006.01)
 *C08G 63/91* (2006.01)
 *C08G 63/48* (2006.01)
 *C08J 3/02* (2006.01)
 *C08L 27/12* (2006.01)

(52) U.S. Cl. ...................... 524/544; 524/501; 524/458; 524/460; 524/520; 524/546; 524/832; 524/833; 525/55; 525/450; 525/451; 525/452; 526/75; 526/78; 526/319; 526/325; 523/201

(58) Field of Classification Search ................ 524/544; 525/326.2
See application file for complete search history.

(56) References Cited

U.S. PATENT DOCUMENTS

| 5,346,949 A | * | 9/1994 | Fukazawa ..................... 524/805 |
| 5,798,406 A | * | 8/1998 | Feret et al. ................. 524/501 |
| 6,395,827 B1 | * | 5/2002 | Pears et al. ................... 525/55 |

FOREIGN PATENT DOCUMENTS

| JP | 2-41378 | 2/1990 |
| JP | 11-256070 | 9/1999 |

* cited by examiner

*Primary Examiner*—Duane Smith
*Assistant Examiner*—Ives Wu
(74) *Attorney, Agent, or Firm*—Morgan Lewis & Bockius LLP

(57) ABSTRACT

Aqueous crosslinkable coating composition suitable for anti-graffiti and heavy duty applications comprising: (A) an aqueous polymer emulsion comprising at least one vinyl fluoropolymer which comprises as a polymerized constituent monomer thereof (i) a fluoromonomer(s) having the formula (1) wherein $R^1$ is $CH_3$ or H, $R^2$ is a per-fluorinated $C_{1-5}$ alkyl group and n is 1, 2, 3 or 4, (ii) a hydroxyl functional monomer(s) and (iii) a carboxylic acid-functional monomer(s) where the vinyl fluoropolymer has a glass transition temperature Tg within the range of from −50 to 90° C. and (B) at least one hydroxyl-reactive crosslinker material

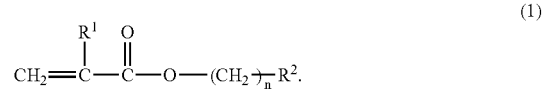

(1)

25 Claims, No Drawings

AQUEOUS CROSSLINKABLE COATING COMPOSITIONS BASED ON VINYL FLUOROPOLYMER

This is a 371 filing of PCT/GB2002/003365, filed Jul. 22, 2002 and is based on United Kingdom application No. 0119728.4, filed Aug. 14, 2001. Priority benefit is claimed based on both of said earlier filings.

The present invention relates to an aqueous crosslinkable coating composition suitable for anti-graffiti and heavy duty applications comprising a certain fluorine-containing, hydroxyl-functional and acid-functional vinyl polymer(s) and a hydroxyl-reactive crosslinker material.

An irritating feature of modern-day life is the marring of the environment by the presence of graffiti—that is, unsightly drawing or writing inked or painted on surfaces provided by structures such as walls and bridges in public places. It is therefore highly desirable that such graffiti be removable as easily and as quickly as possible, for example by using anti-graffiti coatings thereon, which for environmental and safety considerations would desirably be derived from water-based coating compositions rather than solvent-based ones.

In addition to this, water-based systems still lack the superior resistance properties of solvent-based two pack systems which are necessary for coatings on substrates subjected to very heavy wear and tear (heavy duty applications).

U.S. Pat. No. 5,798,406 describes aqueous fluorinated (meth)acrylate latices providing hydrophobic coatings in which defined fluoromonomers, particularly 2,2,2-trifluoroethyl (meth)acrylate, are used as sole fluorocomonomer(s) in emulsion polymerisation to form the latices and are distributed statistically in particles formed in a one-stage process or in the shell of a core-shell or core-intermediate layer-shell type particle. There is no reference to anti-graffiti or heavy duty properties, no mention is made of post-crosslinking the applied coating, and only generalized applications such as building paints, leather and wood varnishes and textile or leather dressings are mentioned in the description, with textile and leather treatment and house paints being exemplified. The option of crosslinking for the purpose of increasing the mass of the emulsion particles during the polymerisation (but not on coating formation) is mentioned, using a small amount (up to 3 weight % of total monomers) of a crosslinking comonomer.

U.S. Pat. No. 5,346,949 is concerned with a coating composition having oil- and water-repellant properties and comprising an emulsion polymer formed from a perfluoroalkyl-acrylate monomer, and unsaturated acid and hydroxyl functional monomers, and a cationic water-soluble salt. Crosslinkability of the composition by adding, inter alia, a blocked isocyanate is mentioned as an option. The fluoromonomer requires 6-12 carbon atoms in the perfluoroalkyl group to achieve the required repellant properties, and the monomer emulsion must be refined to below 0.3 microns using ultrasonic or high pressure homogenisation equipment before commencing the polymerisation—presumably because the known very low solubility of such higher perfluoroacrylates otherwise vitiates polymerisation with the comonomers.

U.S. Pat. No. 5,340,400 describes curable coating compositions based on hydroxyfunctional polyacrylates and polyisocyanates which crosslink after being applied to a substrate to form scratch and heat resistant coatings. There is no mention or exemplification that the polyacrylate component contains fluoro groups in any guise or of any reference to anti-graffiti properties.

We have now invented certain aqueous polymer compositions which provide exceptionally effective anti-graffiti coatings and exceptionally good heavy duty coatings.

According to the present invention there is provided an aqueous crosslinkable coating composition suitable for anti-graffiti and heavy duty applications comprising:

(A) an aqueous polymer emulsion comprising at least one vinyl fluoropolymer in which:
 (i) said at least one vinyl fluoropolymer comprises as a polymerised constituent monomer thereof a fluoromonomer(s) having the formula:

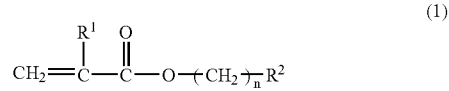

wherein $R^1$ is $CH_3$ or H, $R^2$ is a perfluorinated $C_{1-5}$ alkyl group and n is 1, 2, 3 or 4, and wherein said fluoromonomer(s) forms from 5 to 60 weight % of the total monomers used to prepare said at least one vinyl fluoropolymer;
 (ii) said at least one vinyl fluoropolymer comprises as a polymerised constituent monomer thereof a polymerised hydroxyl functional monomer(s) in an amount to provide or contribute to a hydroxyl value, which said at least one vinyl fluoropolymer possesses, of at least 8 mg KOH/g of solid polymer, preferably within the range of from 8 to 250 mg KOH/g of solid polymer;
 (iii) said at least one vinyl fluoropolymer comprises as a polymerised constituent monomer(s) thereof a carboxylic acid-functional monomer in an amount to provide or contribute to an acid value which, said at least one vinyl fluoropolymer possesses, of within the range of from 2 to 80 mg KOH/g of solid polymer;
 (iv) said at least one vinyl fluoropolymer has a glass transition temperature Tg within the range of from −50 to 90° C.; and
(B) at least one hydroxyl-reactive crosslinker material.

There is also provided according to the invention a method of coating a substrate which method comprises applying a coating composition as defined above to a substrate, causing or allowing the aqueous carrier medium of the composition to be removed, and developing crosslinking of the coating that has been applied to the substrate.

There is further provided according to the invention a crosslinked coating which has been derived from a coating composition as defined above.

There is further provided according to the invention a coated substrate which has been prepared by applying a coating composition as defined above to a substrate, causing or allowing the aqueous carrier medium of the composition to be removed, and developing crosslinking of the coating that has been applied to the substrate.

By an aqueous polymer emulsion of the vinyl fluoropolymer(s) of component (A) is meant herein an emulsion of the polymeric component in a liquid carrier medium of which water is the principal component (at least 50% by weight, more usually at least 90% by weight of the carrier medium).

It has thus been found that the crosslinkable coating composition of this invention which includes a hydroxyl- and acid-functional vinyl fluoropolymer(s) as defined provides an exceptionally effective anti-graffiti coating. More-over, such a coating has a very high chemical resistance to many aggressive industrial substances, such as e.g. hydraulic airplane oil, automobile brake fluid, petrol, diesel, and many cleaning agents. The presence of fluoro groups provided by the fluoromonomer units as defined and the presence of a significant degree of crosslinking in the coating provided by the amount of hydroxyl functionality as defined above and crosslinker, are both essential features for the provision of sufficiently low surface tension (for achieving poor wetting characteristics) and robustness in the coating (for cleaning purposes) as will provide a resistant and unusually effective anti-graffiti surface. It may noted that, unlike in the system of U.S. Pat. No. 5,346,949, no homogenisation step is necessary when preparing the vinyl fluoropolymer(s) since the defined fluoromonomer(s) of formula (1) copolymerize satisfactorily with the other vinyl monomers using conventional emulsion polymerisation conditions.

It is preferred that the average particle size of the vinyl fluoropolymer(s) is within the range of from 20 to 500 nm, more preferably from 25 to 350 nm and most preferably from 30 to 250 nm. (Average particle size herein is that as determined by light scattering using a Malvem Zetasizer 3000 HSa). The vinyl fluoropolymer emulsion may, if desired, have a polymodal, particularly bimodal, particle size distribution.

It is also preferred that the vinyl fluoropolymer(s) has a weight average molecular weight (Mw) within the range of from 5,000 to 5,000,000 Daltons, more preferably from 7,500 to 1,000,000 Daltons, and most preferably from 10,000 to 500,000 Daltons. (Polymer molecular weights may be determined by gel permeation chromatography calibrated using an appropriate known polymer as standard).

The vinyl fluoropolymer(s) has a glass transition temperature (Tg) within the range of from −50° C. to 90° C. Below −50° C. the resulting coating is not likely in some applications to have sufficient chemical resistance, and above 90° C. the coating compositions may require in some applications an undesirably large amount of coalescent (a coalescent is an organic solvent or plasticizer that lowers the minimum film forming temperature of a polymer, thereby permitting a coating from the polymer to form a useful film at a temperature below the Tg of the polymer) which will detract from the coating properties. The Tg of the vinyl fluoropolymer(s) is more preferably in the range of from 0 to 60° C. As is well known, the Tg of a polymer is that temperatures at which the polymer changes from a rubbery, elastic state to a glassy, brittle state. Tg values may be determined experimentally using, inter alia, differential scanning calorimetry DSC, or calculated using the well-known Fox equation. Calculation of the Tg by means of the Fox equation is done as follows. The Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots + \frac{W_n}{Tg_n}$$

The calculated Tg in degrees Kelvin may be readily converted to ° C.

By a vinyl polymer is meant generally herein a polymer derived from the addition polymerisation (normally by a free-radical process) of at least one olefinically unsaturated monomer. (By a vinyl monomer is therefore meant herein an olefinically unsaturated monomer). In the case of the above-defined fluoropolymer of component (A), such a polymer will be made from at least three olefinically unsaturated monomers, viz the fluoromonomer(s), the hydroxyl-functional monomer(s) and the carboxylic acid-functional monomer(s), i.e. the vinyl fluoropolymer will be a copolymer of at least these olefinically unsaturated monomers.

The amount of the fluoromonomer(s) of formula (1) used to prepare the defined fluoropolymer of component (A) is within the range of from 5 to 60 weight % based on the total amount of monomers employed. Use of less than 5 weight % would be unlikely to result in any improved effect due to the fluoromonomer(s), while use of more than 60 weight % would be extremely expensive and probably not result in further improvements in properties. More preferably the amount of fluoromonomer(s) is within the range of from 5 to 50 weight % and still more preferably from 6 to 45 weight %, based on the total amount of monomers employed. Preferably the fluoromonomer of formula (I) is 2,2,2-trifluoroethyl methacrylate (TFEMA) or 2,2,2-trifluoroethyl acrylate (TFEA).

The hydroxyl value of the defined vinyl fluoropolymer(s) of component (A) is, as specified above, at least 8 mg KOH/g of solid polymer, preferably within the range of from 8 to 250 mg KOH/g of solid polymer. A hydroxyl value below 8 would likely result in a crosslink density in the resulting coating which is too low to achieve much improvement in anti-graffiti and heavy duty properties. More preferably, the hydroxyl value is within the range of from 20 to 175 mg KOH/g of solid polymer and most preferably within the range of from 30 to 140. Examples of suitable hydroxyl functional vinyl monomer(s) which may be used to provide or contribute to the hydroxyl functionality of the vinyl fluoropolymer include hydroxy-functional esters of acrylic acid, methacrylic acid, maleic acid and fumaric acid. Examples of such monomers include hydroxy functional alkyl (preferably 1 to 18C) (meth)acrylates such as 2-hydroxyethyl acrylate, 2-hydroxyethyl methacrylate, 2-hydroxy-n-propyl acrylate, 2-hydroxy-n-propyl methacrylate, 3-hydroxy-n-propyl methacrylate, 3-hydroxy-n-propyl acrylate, 4-hydroxy-n-butyl acrylate, 4-hydroxy-n-butyl methacrylate, hydroxystearyl acrylate, hydroxystearyl methacrylate; dihydroxy alkyl (preferably 1 to 6C) adducts of maleic acid, fumaric acid, and phthalic acid; polyethylene oxide or polypropylene oxide functionalised hydroxyl functional (meth)acrylates such as the commercially available materials known as BISOMER PPM5S and BISOMER PPM6E (International Specialty Chemicals); caprolactone acrylate monomers such as the commercial available material known as TONE M100 Monomer (Union Carbide). The most preferred hydroxy functional monomers are 2-hydroxyethyl methacrylate (HEMA), 2-hydroxyethyl acrylate (HEA), 2-hydroxy-n-propyl methacrylate, 2-hydroxy-n-propyl acrylate, 3-hydroxy-n-propyl methacrylate, 3-hydroxy-n-propyl acrylate, 4-hydroxy-n-butyl acrylate, and 4-hydroxy-n-butyl methacrylate.

The acid value of the defined vinyl fluoropolymer(s) of component (A) is, as specified above, within the range of from 2 to 80 mg KOH/g of solid polymer. More preferably it is within the range of from 4 to 55 mg KOH/g of solid polymer, most preferably within the range of from 6 to 45. The presence of the acid functionality as defined is essential to provide a balancing effect to the low surface tension provided by the fluoromonomer of formula (I) in order for the coating to be acceptably adherable to a substrate. It may also provide or assist aqueous dispersion stability in the vinyl fluoropolymer emulsion, and may also provide additional crosslinking on coating formation by reaction with the hydroxyl-functional crosslinker material if the latter is of a suitable type (such as a polyisocyanate). Still further, in the case of pigmented invention compositions, it may advantageously improve the pigment wetting properties of the vinyl fluoropolymer. Examples of suitable carboxylic acid functional vinyl monomer(s) which may be used to provide or contribute to the acid functionality of the vinyl fluoropolymer include acrylic acid, methacrylic acid, beta-carboxyethyl acrylate, itaconic acid, crotonic acid, fumaric acid, maleic acid, and maleic anhydride; most preferred are acrylic acid, methacrylic acid, and beta-carboxyethyl acrylate.

The monomer system used to prepare the defined vinyl fluoropolymer of component (A) may, and usually will, also include a vinyl monomer(s) which is other than a fluorine-containing monomer, a hydroxyl-functional monomer or an acid-functional monomer (hereinafter a non-fluoro, non-hydroxyl, non-acid vinyl monomer). Such non-fluoro, non-hydroxy, non-acid monomer is preferably used in an amount within the range of from 0 to 93 weight % based on the total amount of monomers used to prepare the vinyl fluoropolymer, more preferably from 3 to 90 weight %, and particularly from 17 to 87 weight %. (It is to be understood the weight % of all monomers used to prepare the vinyl fluoropolymer must add up to 100).

Examples of suitable non-fluoro, non-hydroxyl, non-acid vinyl monomers include conjugated dienes; styrene or substituted styrenes, olefines such as ethylene or propylene; vinyl halides such as vinylidene chloride and vinyl chloride; olefinically unsaturated amides; vinyl esters; vinyl ethers; olefinically unsaturated nitriles; heterocyclic vinyl compounds; diesters of fumaric and maleic acid; and, in particular, esters of acrylic acid and methacrylic acid of formula:

$$CH_2=CR^4CO_2R^5 \qquad (2)$$

where $R^4$ is H or methyl and $R^5$ is optionally substituted alkyl of 1 to 20 carbon atoms (more preferably 1 to 8 carbon atoms) or cycloalkyl of 5 to 12 ring carbon atoms. More specific examples of such monomers include alkylesters and (chloro)alkyl esters such as methyl acrylate, ethyl acrylate, n-propyl acrylate, n-butyl acrylate, i-butyl acrylate, t-butyl acrylate, n-octyl acrylate, 2-ethylhexyl acrylate, lauryl acrylate, isopropyl acrylate, isobornyl acrylate, cyclohexyl acrylate, methyl α-chloroacrylate, n-propyl α-chloroacrylate, n-butyl α-chloroacrylate, β-chloroethyl acrylate, β-chlorobutyl acrylate, methyl methacrylate, ethyl methacrylate, n-propyl methacrylate, isopropyl methacrylate, n-butyl methacrylate, i-butyl methacrylate, t-butyl methacrylate, isobornyl methacrylate, cyclohexyl methacrylate, 2-ethylhexyl methacrylate, octyl methacrylate, lauryl methacrylate, diethyl maleate, diethyl fumarate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, α-methyl styrene, o-methyl styrene, m-methyl styrene, p-methyl styrene, pentachlorostyrene, o-chlorostyrene, m-chlorostyrene, p-chlorostyrene and p-cyanostyrene; conjugated dienes or chlorodienes such as butadiene and chloroprene and vinyl-substituted heterocyclic imines such as 2-vinyl-pyridine and vinyl carbazole. Other monomers include di-hydroxyalkyl (meth)acrylate adducts of organic diisocyanates, such as the di-hydroxyethyl methacrylate adduct of a $C_9H_{18}$ diisocyante sold by Rohm GmbH as PLEX 6661.0. (It is to be understood that all the above monomers in this paragraph exclude fluorine-containing, acid-containing and hydroxyl-containing groups).

Typically the vinyl fluoropolymer component (A) will be derived from a monomer system which contains 5 to 60 weight % of a fluoromonomer(s) of formula (1), preferably TFEMA or TFEA (more preferably 5 to 50 weight %, still more preferably 6 to 45 weight %); 2 to 58 weight % of a non-fluoro, non-acid, hydroxyl functional monomer(s), preferably selected from one or more of 2-hydroxyethyl acrylate and methacrylate, 2-hydroxy-n-propyl acrylate and methacrylate, 3-hydroxy-n-propyl acrylate and methacrylate, and 4-hydroxy-n-butyl acrylate and methacrylate (more preferably 5 to 40 weight %, still more preferably 7 to 32 weight %) (and subject to the above defined limitation concerning the hydroxyl value of the polymer); 0.2 to 10 weight % of a non-fluoro, non-hydroxy, carboxylic acid functional monomer(s), preferably one or more of acrylic acid, methacrylic acid and β-carboxyethyl acrylate (more preferably 0.3 to 7 weight %, still more preferably 0.4 to 6 weight %) (and subject to the above defined limitation concerning the acid value of the polymer); and 0 to 92 weight % of a non-fluoro, non-acid, non-hydroxyl monomer(s), preferably selected from one or more $C_1$-$C_8$ alkyl acrylates or methacrylates, examples of which are methyl methacrylate, n-butyl acrylate, n-butyl methacrylate, ethyl acrylate, and 2-ethylhexyl acrylate, one or more cycloalkyl acrylates or methacrylates of 5 to 12 ring C atoms, examples of which are isobornyl methacrylate and cyclohexyl methacrylate, and one or more styrenes, examples of which are styrene itself and α-methyl styrene (more preferably 3 to 90 weight %, still more preferably 17 to 87 weight %). (All weight % values are based on the total weight of monomers used for the polymerisation).

The vinyl fluoropolymer(s) of component (A) of the aqueous polymer composition is as mentioned above made using an addition, preferably free-radical, polymerisation process, and this is normally an aqueous emulsion polymerisation process to form an aqueous polymer emulsion (i.e. an aqueous polymer latex). Such an aqueous emulsion polymerisation process is usually in itself, extremely well known and need not be described in great detail. Suffice to say that such a process involves dispersing the monomers in an aqueous medium and conducting polymerisation using a free-radical initiator and (usually) appropriate heating (e.g. 30 to 120° C.) and agitation (stirring) being employed. The aqueous emulsion polymerisation can be effected using one or more conventional emulsifying agents (surfactants). Chain transfer agents (e.g. mercaptanes) may be included if desired to control molecular weight.

An emulsion polymerisation process used for making the vinyl fluoropolymer(s) of component (A) may be carried out using an "all-in-one" batch process (i.e. a process in which all the materials to be employed are present in the polymerisation medium at the start of polymerisation) or a semi-batch process in which one or more of the materials employed (usually at least one of the monomers), is wholly or partially fed to the polymerisation medium during the polymerisation. In particular, the vinyl fluoropolymer may be made using a single monomer feed containing all or substantially all the monomers for the polymerisation, or two or more monomer feeds (usually just two) may be used in which some of the monomers for the polymerisation are in one of the feeds and the other monomers are in the other feed (or feeds). Such multi feeds may be fed to the polymerisation at the same time or may be added sequentially. In another variant, one of the feeds is fed to another feed while the latter is itself being fed to the polymerisation (this being known in the art as a "powerfeed" process).

The at least one hydroxyl-reactive crosslinker material of component (B) is preferably present in an amount such that the ratio of hydroxyl groups from the polymer(s) of component (A) to the hydroxyl-reactive groups of the crosslinker material of component (B) is in the ratio range of from 0.1 to 10, more preferably from 0.2 to 5, and most preferably from 0.5 to 2. The hydroxyl-reactive crosslinker material, which may in some cases may also be carboxyl-reactive, may be incorporated into the invention composition by simple admixture with the aqueous polymer emulsion of component (A). Preferably this is effected shortly before the composition is applied to a substrate to form a suitable coating.

Suitable examples of hydroxyl-reactive crosslinker materials which may be used include organic polyisocyanates, organic blocked polyisocyanates, organic isothiocyanates and melamine-based resins. However organic polyisocyanates are preferred (i.e. the hydroxyl-reactive groups being NCO groups). Such polyisocyanate may be any organic polyisocyanate containing (cyclo)aliphatically, aryl-aliphatically and/or aromatically bound NCO groups which is normally liquid at ambient temperature. More preferably, it is a polyisocyanate (or polyisocyanate mixture) having only aliphatically and/or (cyclo)aliphatically bound isocyanate groups (and average NCO functionality of 2.1 to 5).

Suitable polyisocyanates include 1,6-hexane-diisocyanate, 1-isocyanato-3,3,5-trimethyl-5-isocyanatomethylcyclohexane (isophorone diisocyanate) and bis-isocyanatocyclohexyl-methane, and also the biuret, urethane, uretdione and/or isocyanurate derivatives of such diisocyanates. Useful aliphatic polyisocyanates include biuret polyisocyanates based on 1,6-hexane-diisocyanates and which are based on mixtures of N,N',N"-tris-(6-isocyanatohexyl)-polyisocyanates with small quantities of its higher homologues. Also useful are the cyclic trimers of 1,6-hexane-diisocyanate which are based on N,N',N"-tris-(6-isocyanatohexyl)-isocyanurate in admixture with small quantities of its higher homologues. Also useful are such trimers when modified with polyethylene oxide chains to render them water-dispersible.

Aromatic or aryl-aliphatic polyisocyanates which may be used include those based on 2,4-diisocyanato-toluene or commercial mixtures thereof with 2,6-diisocyanato-toluene, or based on 4,4'-diisocyanatodiphenylmethane or mixtures thereof with its isomers and/or higher homologues. Another such polyisocyanate which may be used is meta-tetramethylxylylene diisocyanate (TM X DI).

A particularly useful polyisocyanate for use in the present invention is the product Bayhydur 3100 (Bayer AG); this is a polyethylene glycol functionalised isocyanurate and is widely available commercially.

While the defined vinyl fluoropolymer(s) of component (A) may provide the sole binder polymer(s) of this component of the composition, in one particularly advantageous embodiment of the invention the aqueous polymer emulsion of the component (A) also includes a polymer(s) having no fluorine groups (hereinafter a non-fluoropolymer(s)), preferably being a vinyl polymer(s). Any suitable non-fluoropolymer(s) may be used but it is preferred that such a polymer(s) (preferably being a vinyl polymer) is hydroxyl-functional like the vinyl fluoropolymer, so that both types of polymer are crosslinked by the crosslinker material of component (B) when a coating is formed.

Suitable non-fluoro vinyl polymers in this embodiment may also, and usually will, contain constituent polymerised monomer(s) which are selected from the same list of non-fluoro, non-hydroxyl, non-acid vinyl monomers described above for the preparation of the defined vinyl fluoropolymer of component (A), and, in particular, esters of acrylic acid and methacrylic acid of formula (2) (see above).

A non-fluoro vinyl polymer in this embodiment may also, and often will (as mentioned above) contain constituent hydroxyl-functional vinyl monomer(s) in order to provide hydroxyl functionality in the polymer, suitable ones including those selected from the same list given above for making the vinyl fluoropolymer, with the same preferments being applicable (see above).

A non-fluoro vinyl polymer in this embodiment may also, and usually will, contain carboxylic acid-functional vinyl monomer(s) in order to provide acid functionality in the polymer, suitable ones including those selected from the same list given above for making the vinyl fluoropolymer, with the same preferments being applicable (see above).

In fact the non-fluoropolymer(s) in this embodiment preferably has a hydroxyl value within the range of from 0 to 250 mg KOH/g of solid polymer, more preferably from 20 to 175 and most preferably from 30 to 140, and an acid value within the range of from 0 to 80 mg KOH/g of solid polymer.

The Tg of the non-fluoropolymer(s) is preferably in the range of from −50 to 90° C., more preferably 0 to 60° C.

The Mw of the non-fluoro polymer(s) is preferably in the range of from 5,000 to 5,000,000 Daltons, more preferably from 7,500 to 1,000,000 Daltons, and most preferably from 10,000 to 500,000 Daltons.

It is particularly preferred that the average particle size of the non-fluoro polymer(s) in this embodiment is within the range of from 30 to 600 nm, more preferably from 50 to 550 nm, and most preferably from 80 to 500 nm.

The use of a non-fluoropolymer(s) with the fluoropolymer(s) in component (A) of the invention composition advantageously allows the possibility of imparting benefits from both types of polymer to the composition as a whole and may, e.g. allow the minimum film forming temperature of the composition to be fine-tuned according to what is considered desirable in a particular application.

A particularly important advantage of using a combination of non-fluoro and fluoropolymers in component (A) is that it allows much less of the (usually quite expensive) fluoropolymer to be used without unacceptably detracting from the anti-graffiti performances of the resulting coating. It is believed that this occurs due to the fluoropolymer particles from the emulsion migrating towards the surface of the coating and so providing a coating surface that is comparatively enriched with fluoro groups—the interior of the coating being comparatively richer in non-fluoro polymer.

Thus it is found that fluoropolymer(s)/non-fluoro polymer (s) weight ratios within the range of from 99/1 to 10/90, more preferably from 95/5 to 15/85, and most preferably from 60/40 to 20/80 are particularly useful as they allow the possibility of making compositions ranging from fluoropolymer rich to fluoropolymer poor, each having their specific benefits, but with the fluoropolymer poor compositions still providing good anti graffiti properties as described above. In this way one may optimise the cost-performance of the compositions.

In order to enhance the effect of being able to use less fluoropolymer without detracting from anti-graffiti performance, it is preferred that the average particle size of the fluoropolymer(s) particles should be smaller than the average particle size of the non-fluoro polymer(s) particles, more preferably smaller by at least 10 nm, and still more preferably smaller by at least 20 nm.

The combination of a fluoropolymer(s) and a non-fluoropolymer(s) in component (A) for this embodiment may be effected in any suitable manner, but most simply and preferably by mixing the two types of polymer (normally as polymer emulsions) in the desired polymer weight ratio and under suitable agitation (e.g. with a stirrer). More than one fluoropolymer and more than one non-fluoro polymer can be used.

Typically a non-fluoropolymer in this embodiment will be derived from a monomer system which comprises 32 to 100 weight % of a non-fluoro, non-acid, non-hydroxyl monomer(s), preferably selected from one or more $C_1$-$C_{18}$ alkyl acrylates or methacrylates, examples of which are methyl methacrylate, n-butyl acrylate, n-butyl methacrylate, ethyl acrylate, and 2-ethylhexyl acrylate, one or more cycloalkyl acrylates or methacrylates of 5 to 12 ring C atoms, examples of which are isobornyl methacrylate and cyclohexyl methacrylate, and one or more styrenes examples of which are styrene itself and α-methyl styrene (more preferably 53 to 95 weight %, still more preferably 62 to 93 weight %); 0 to 58 weight % of a non-fluoro, non-acid, hydroxyl functional monomer(s), preferably selected from one or more of 2-hydroxyethyl acrylate or methacrylate, 2-hydroxyl-n-propyl acrylate or methacrylate, 3-hydroxy-n-propyl acrylate or methacrylate, and 4-hydroxy-n-butyl acrylate or methacrylate (more preferably 5 to 40 weight %, still more preferably 7 to 32 weight %); and 0 to 10 weight % of a non-fluoro, non-hydroxy, carboxylic acid-functional monomer(s), preferably one or more of acrylic acid, methacrylic acid and β carboxyethyl acrylate (more preferably 0 to 7 weight %, still more preferably 0.4 to 6 weight %). (All weight % values are based on the total weight of monomers used for the polymerisation).

The aqueous polymer emulsion of component (A) preferably has a polymer solids content within the range of from 20 to 60 weight % (more preferably 25 to 55 weight %).

The coating compositions of the invention may be applied to a wide variety of substrates which have a surface where anti-graffiti and/or heavy duty properties are required; examples of such substrates include metals; wood; wood-based materials (such as particle board, fibreboard and paper); glass; mineral building materials such as stone, concrete, lime- and/or cement-based plasters, gypsum-containing surfaces, fibre-cement building material and gypsum-containing surfaces; unformed plastics; and plastics foam. Application may be by any conventional method including brushing, dipping, flow coating, spraying, roller coating, pad coating and the like.

The coating compositions may contain other ingredients, additives or auxiliaries, such as coalescents, pigments, dyes, emulsifiers (surfactants), pigment dispersion aids, crosslinking catalysts, levelling agents, anti-cratering agents, anti-foam agents, thickeners, sedimentation inhibitors, heat stabilisers, UV absorbers, antioxidants, and fillers.

The incorporation of coalescents into the composition would for the purpose of optimising or fine tuning film-forming properties, usually being present in an amount of 0 to 55 weight %, more preferably 1 to 20 weight %, still more preferably 2-10 weight %, based on the weight of the aqueous polymer emulsion of component (A). Examples of suitable coalescents include dipropylene glycol mono n-butyl ether, dipropylene glycol mono methyl ether, butyl glycol, ethylene diglycol, and 2,2,4-trimethyl-1,3-pentene diol monoisobutylate.

Such other ingredients, additives and auxiliaries are usually best incorporated into component (A) of the compositions before the addition of component (B).

The coating compositions once applied may be allowed to dry naturally at ambient temperature, and/or the drying process may be accelerated by heat. Crosslinking can be developed by allowing to stand for a prolonged period at ambient temperature (eg several days) and/or by heating at an elevated temperature (e.g. from 50° C. to 160° C.) for a much shorter period of time (in which case the drying and crosslink development steps can be combined into one operation if desired).

By ambient temperature in this specification is meant for practical purposes a temperature within the range of from 15 to 30° C.

The present invention is now illustrated, but not limited, by reference to the following examples. Unless otherwise specified all parts, percentages and ratios are on a weight basis. The prefix C before an example number denotes that it is comparative.

In the examples the following abbreviations or trade names are employed:

| | |
|---|---|
| BA = | n-butyl acrylate |
| EA = | ethyl acrylate |
| MMA = | methyl methacrylate |
| i-BMA = | isobutyl methacrylate |
| BMA = | n-butyl methacrylate |
| S = | styrene |
| β-CEA = | β-carboxyethyl acrylate |
| TFEMA = | 2,2,2-trifluoroethyl methacrylate |
| AA = | acrylic acid |
| MAA = | methacrylic acid |
| Disponil FES993IS (Henkel) = | lauryl ether sulphate (12EO) Na salt (surfactant) |
| EO = | ethylene oxide |
| DMEA = | N,N-dimethylethanolamine |
| Bayhydur 3100 (Bayer) = | polyethyleneglycol functionalised polyisocyanate |
| Aerosol GPG = (American Cyanamid) | sodium dioctyl sulphosuccinate (surfactant) |
| i-AscA = | iso ascorbic acid |
| t-BHPO = | t-butyl hydroperoxide |
| AP = | ammonium persulphate |
| LMKT = | lauryl mercaptane |
| SLS = | sodium lauryl sulphate |
| Byk 348 (Byk Chemie) = | wetting agent |
| Skydrol = | hydraulic oil used in airplanes |
| DOT3 = | automobile brake fluid |
| EDG = | ethylene diglycol (coalescing solvent) |
| MEK = | methyl ethyl ketone |
| SA = | stoichiometric amount |
| Cymel 325 (Cytec Industries) = | methylated melamine formaldehyde resin |
| Zonyl FSO (Du Pont) = | nonionic fluoro surfactant |
| Nuvis FX-1070 (Servo Delden) = | thickener |
| Dowanol DPnB (Du Pont) = | coalescent |

Determination of Anti-graffiti Properties.

Coatings (100 μm wet) were cast on a Leneta Chart and dried for 6 hours at ambient temperature followed by 16 hours at 60° C. Edding permanent markers (black, brown, yellow, green, orange, red, and blue) were used to apply graffiti in the form of marker spots on the dried films at ambient temperature. The graffiti was left on the film for 16 hours after which a cotton cloth soaked with MEK was used to remove the graffiti from the coating surface by rubbing the cloth to and fro over the spots. The ease of removal was judged visually and rated from 5 (no visible mark left and surface intact) to 0 (coating removed) for each color applied. The maximum total rating was 35 (i.e. cumulative total for the 7 markers).

Determination of Resistances Against Oils, DOT3 and Skydrol.

Films were prepared as described for the anti-graffiti tests. The films were subjected to the various substances under test by placing a cotton cloth soaked with material under test on top of the films under test and covering each with a small petri dish, the films then being kept at ambient temperature for 16 hours. After removal of the cloths the residual substance was removed with a paper tissue. The films were judged visually on a scale from 0 (coating removed) to 5 (no visible mark left from penetration of the substance under test and coating intact).

Preparation of Aqueous Emulsions of Fluoro-containing Hydroxyl and Acid-functional Polymers P1, P2 and P7.

In the preparation of polymer P1 a 2 L three-neck round bottom glass reactor, equipped with a stirrer, $N_2$ inlet, thermometer and baffles was loaded with the amounts listed In the following Table 1. In dropping funnels the mixtures for monomer feed 1 and monomer feed 2 were prepared by stirring the components according the amounts listed in Table 1 (the feeds being kept at ambient temperature). At ambient temperature 5% of monomer feed 1 was pre-charged to the reactor and the temperature of the reactor contents raised to 85° C. Next, the rest of monomer feed 1 was added to the now hot reactor contents over a period of 45 minutes. After the end of monomer feed 1, monomer feed 2 was added over 45 minutes. Subsequently the reaction mixture was kept at 85° C. for 30 minutes and the pH was adjusted, using a 50% N,N-dimethyl ethanolamine (DMEA) solution to about 7. The reaction mixture was cooled, filtered and collected.

Polymers P2 and P7 were prepared according similar procedures (there being no monomer feed 2 in these preparations), with t-BHPO and i-AscA being used to remove residual monomer in the case of polymer P7.

Preparation of Aqueous Emulsions of Fluoro-containing Hydroxyl and Acid-functional Polymers P3, P4, P5 and P6.

In the preparation of polymer P3 a 2L three-neck round bottom glass reactor, equipped with a stirrer, $N_2$ inlet, thermometer and baffles was loaded with the amounts listed in Table 1. In dropping funnels the mixtures for initiator feed and monomer feed 1 were prepared by stirring the components according the amounts listed in Table 1. The reactor phase was heated to 80-85° C. and then 5% of monomer feed 1 and 35% of the initiator feed were added. After 5 minutes the remainder of monomer feed 1 was added in 90 minutes and the remaining initiator fed was added in 100 minutes after which the mixture was kept at 85° C. for another 30 minutes. Next, tert-butylhydroperoxide (t-BHPO) and iso-ascorbic acid (i-AscA) were added to consume the remaining monomers. After 15 minutes the pH of the reaction mixture was adjusted to about 7 with a 50% N,N-dimethyl ethanolamine solution. After cooling the emulsion was filtered and collected.

Polymers 4, 5 and 6 were prepared similarly (using a dropping funnel containing monomer feed 2 in the case of P4 and P5). Polymer P4 was prepared by adding each monomer feed in 45 minutes. Polymer P5 was prepared by continuously feeding monomer feed 2 to monomer feed 1, which was fed to the reaction mixture.

(In the following Table 1, all amounts of components quoted are in grams).

TABLE 1

|  | P1 | P2 | P3 | P4 | P5 | P6 | P7 |
|---|---|---|---|---|---|---|---|
| In Reactor |  |  |  |  |  |  |  |
| Water | 798.1 | 1364.1 | 471.9 | 354.0 | 181.4 | 368.1 | 512.0 |
| AP | 1.7 | 2.9 |  |  |  |  | 1.5 |
| SLS |  | 45.7 |  |  |  | 3.9 |  |
| Aerosol GPG | 11.7 |  |  |  |  |  | 8.3 |
| Disponil FES993IS |  |  | 2.6 | 1.9 | 2.8 |  |  |
| Initiator feed |  |  |  |  |  |  |  |
| AP 1.5% |  |  | 123.3 | 92.5 | 134.7 | 194.8 |  |
| Disponil FES993IS |  |  | 7.8 | 5.9 | 8.5 |  |  |
| Monomer feed 1 |  |  |  |  |  |  |  |
| Water |  |  | 266.4 | 199.8 | 113.5 | 230.5 | 124.6 |
| Disponil FES993IS |  |  | 7.7 | 5.8 | 3.4 |  |  |
| Aerosol GPG |  |  |  |  |  |  | 1.5 |
| SLS |  |  |  | 2.4 |  | 35.1 |  |
| TFEMA |  | 116.5 | 92.5 | 18.5 | 107.7 | 58.5 | 87.3 |
| MAA | 14.5 | 46.6 | 3.1 | 2.3 |  |  | 14.6 |
| β-CEA |  |  | 15.4 | 11.6 |  |  |  |
| AA |  |  |  |  | 1.4 |  |  |
| MMA | 128.4 | 189.3 | 197.4 |  | 77.8 | 274.2 |  |
| HEMA | 87.1 | 174.8 | 135.6 | 184.6 | 53.9 |  | 29.1 |
| BA | 60.3 | 55.5 | 172.5 | 98.9 | 23.2 | 251.9 | 31.7 |
| S |  |  |  | 151.7 | 5.4 |  |  |
| i-BMA |  |  |  |  |  |  | 128.3 |
| LMKT |  |  | 15.4 | 11.6 | 6.7 |  |  |
| Monomer feed 2 |  |  |  |  |  |  |  |
| Water |  |  |  | 115.4 | 269.2 |  |  |
| TFEMA |  | 35.0 |  | 38.8 | 161.6 |  |  |
| Disponil FES993IS |  |  |  |  | 5.1 |  |  |

TABLE 1-continued

|  | P1 | P2 | P3 | P4 | P5 | P6 | P7 |
|---|---|---|---|---|---|---|---|
| SLS |  |  |  |  | 5.6 |  |  |
| MAA | 3.0 |  |  |  |  |  |  |
| β-CEA |  |  |  |  |  |  |  |
| AA |  |  |  | 8.1 | 12.1 |  |  |
| MMA |  |  |  |  | 49.1 |  |  |
| BA | 6.0 |  |  | 51.5 | 79.4 |  |  |
| S |  |  |  | 95.6 | 8.1 |  |  |
| LMKT |  |  |  | 5.2 | 10.1 |  |  |
| pH adjustment | DMEA | $NH_3$ | DMEA | DMEA | DMEA |  | DMEA |
| Post-reaction |  |  |  |  |  |  |  |
| t-BHPO 30% |  |  | 1.1 | 0.8 | 1.2 | 1.1 | 1.0 |
| i-AscA 5% |  |  | 6.7 | 5.0 | 7.3 | 6.3 | 5.8 |
| Specifications |  |  |  |  |  |  |  |
| Wt % TFEMA | 9.9 | 20 | 15 | 7.8 | 40.8 | 10 | 30 |
| pH | 7.4 | 7.0 | 7.1 | 7.0 | 7.4 | 8.5 | 6.8 |
| Solids (%) | 30 | 30 | 40 | 40 | 46.6 | 40.5 | 30 |
| Viscosity (mPa · s) | 74 | 9 | 43 | 55 | 590 | 10 | 12 |
| Av. Particle size (nm) | 122 | 62 | 120 | 117 | 135 | 126 | 68 |

The hydroxyl (OH) values, acid values (AV) and Tg's of the various fluoropolymers P1 to P7 were as follows (Tg's were calculated using the Fox equation).

TABLE 2

| Fluoropolymer no. | OH value (mg KOH/g) | AV (mg KOH/g) | Tg (° C.) ($1^{st}$ phase/ $2^{nd}$ phase) |
|---|---|---|---|
| P1 | 128.6 | 32.4 | 50/60.6 |
| P2 | 125.5 | 52.2 | 70 |
| P3 | 94.9 | 9.9 | 32.5 |
| P4 | 231.5 | 14.8 | 37.7/46.4 |
| P5 | 88.0 | 15.6 | 66.4/43.9 |
| P6 | 0 | 0 | 20 |
| P7 | 43.2 | 32.6 | 51.5 |

EXAMPLES 1, 2, 3, 4, 5, C6 AND 7

The aqueous emulsions of the polymers P1, P2, P3, P4, P5 and P7 as prepared above were formulated with 1.5 SA Bayhydur LS3100 (trademark of Bayer) and 0.1 g Byk 348 (trademark of BYK-Chemie) to form, respectively, the invention compositions of Examples 1, 2, 3, 4, 5, and 7, while the aqueous emulsion of polymer P6 was formulated with 6% EDG and 2% Byk 348 to form the comparative composition of Example C6. The commercially available polymer emulsion NeoCryl XK-100 (NeoCryl is a trademark of Avecia Ltd), being a styrene-acrylic non-fluorofunctional, hydroxyl and acid-functional emulsion polymer (OH value 129.5 mgKOH/g of solid resin) was used as a reference. The anti-graffiti results are summarized In Table 3. The chemical resistances towards Petrol, Diesel, DOT3 (brake fluid) and Skydrol of Examples 1, 5, C6 and NeoCryl XK-100 are shown in Table 4.

TABLE 3

| | Example No. | | | | | | | |
|---|---|---|---|---|---|---|---|---|
| | 1 | 2 | 3 | 4 | 5 | C6 | 7 | Ref: XK-100 |
| Anti-graffiti rating | 33 | 32 | 30 | 32 | 32 | 7 | 24 | 14 |

Table 3 shows that the absence of fluoromonomer (as in NeoCryl XK-100) or the absence of crosslinking (Example C6) does not result in effective anti-graffiti properties.

TABLE 4

| | Example No. | | | |
|---|---|---|---|---|
| | 1 | 5 | C6 | XK-100 |
| Resist. to Petrol | 5 | 5 | 1 | 4 |
| Resist. to Diesel | 5 | 5 | 1 | 5 |
| Resist. to Skydrol | 5 | 4 | 0 | 2 |
| Resist. to DOT3 | 4 | 3 | 0 | 3 |

Table 4 shows that the presence of both fluoro groups and crosslinking results in improved chemical resistances.

EXAMPLES 8, 9 AND 10

Compositions according to the invention, Examples 8, 9 and 10, were prepared using blends of the non-fluorofunctional, hydroxyl and acid-functional polymer emulsion NeoCryl XK-100 with the aqueous emulsion of polymer P5 as component (A) of the compositions. The blends were prepared by mixing the polymers according the amounts as listed in Table 5 under stirring. The blends were formulated with 1.5 SA Bayhydur 3100 and 0.1 gram Byk 348. Films were cast and dried as described above. The anti-graffiti test was performed as described above.

TABLE 5

| Ex. No. | Fluoro polymer | Amount (g) | Non-fluoro polymer | amount (g) | Anti-graffiti rating |
|---|---|---|---|---|---|
| reference | — | 0 | XK-100 | 100 | 14 |
| Ex 8 | P5 | 20 | XK-100 | 80 | 33 |
| Ex 9 | P5 | 50 | XK-100 | 50 | 33 |
| Ex 10 | P5 | 80 | XK-100 | 20 | 31 |

Table 5 shows that the introduction of a fluoropolymer as per the invention in blends improves anti-graffiti rating, and this rating is not detracted from even at low levels of the fluoropolymer.

EXAMPLE 11

The aqueous emulsion of polymer P2 was formulated with the melamine curing agent Cymel 325 (6.6% on P2), 50% Nuvis FX-1070 (3.1% on P2) and Zonyl FSO (0.07% on P2). 150 μm wet films was cast and subjected to a 10 minute flash off followed by drying during 30 minutes at 140° C. The films were subjected to the anti-graffiti test and the rating was 35.

Preparation of Aqueous Emulsions of Non-fluoro Vinyl Volymers P9-P13

All polymers were prepared using the amounts listed in Table 6 using the procedure described for the preparation of P1, P2 and P7 with the difference that the reactor phase was heated to 75° C. at which point the precharge was added. The sequential polymer P10 was prepared by feeding both monomer feeds each in 45 minutes and maintaining a 5 minute waiting period between the two monomer feeds. Polymer P11 was prepared by continuously feeding monomer feed 2 into monomer feed 1, which was fed to the reactor.

(In the following Table 6, all amounts of components are in grams).

TABLE 6

|  | P9 | P10 | P11 | P12 | P13 | P14 | P15 |
|---|---|---|---|---|---|---|---|
| In Reactor | | | | | | | |
| Water | 583.1 | 584.0 | 629.8 | 573.5 | 390.2 | 315.7 | 736.7 |
| AP | 0.3 | | 0.3 | 0.3 | 0.2 | 0.2 | 1.2 |
| SLS | 1.9 | | 2.9 | 19.4 | | | |
| Disponil FES993IS | | | | | 2.1 | | 19.0 |
| Monomer feed 1 | | | | | | | |
| Water | 281.7 | 139.0 | 142.6 | 277.8 | 166.3 | 112.6 | |
| SLS | 17.5 | 11.8 | 15.9 | 19.4 | | 11.8 | |
| Disponil FES993IS | | | | | 18.5 | | |
| LMKT | 5.8 | | | | | | |

TABLE 6-continued

|  | P9 | P10 | P11 | P12 | P13 | P14 | P15 |
|---|---|---|---|---|---|---|---|
| MAA | 5.8 | 5.9 | | 11.7 | 24.7 | | 2.4 |
| AA | | | | | | 28.3 | |
| HEMA | 58.3 | | 70.4 | 174.9 | 82.2 | 66.4 | 97.2 |
| MMA | | 175.2 | 234.8 | 281.9 | 82.2 | | |
| BA | 281.3 | 112.8 | 47.0 | 114.6 | 39.3 | 133.2 | 39.8 |
| BMA | | | | | 182.6 | | 103.6 |
| S | 237.7 | | | | | 214.9 | |
| AP | 2.6 | 1.5 | 1.6 | 2.6 | 1.8 | 2.0 | |
| Monomer feed 2 | | | | | | | |
| Water | | 139.0 | 95.1 | | | | |
| SLS | | 11.8 | 10.6 | | | | |
| MAA | | 11.8 | | | | | |
| HEMA | | | 47.0 | | | | |
| MMA | | 201.7 | | | | | |
| BA | | 80.4 | | | | | |
| S | | | 130.5 | | | | |
| 2-EHA | | | 57.3 | | | | |
| AP | | 1.5 | 1.1 | | | | |
| pH adjustment Post-reaction | NH₃ | NH₃ | NH₃ | NH₃ | DMEA | DMEA | DMEA |
| t-BHPO 30% | 1.1 | 1.1 | 1.1 | 1.1 | 1.4 | 1.5 | |
| i-AscA 5% | 6.3 | 6.3 | 6.3 | 6.3 | 8.2 | 8.6 | |
| Specifications | | | | | | | |
| pH | 8.7 | 8.2 | 8.5 | 7.5 | 7.0 | 6.21 | 7.3 |
| Solids (%) | 40 | 40 | 40 | 40 | 42 | 50 | 25 |
| Viscosity (mPa · s) | 23 | 10 | 12 | 20 | 275 | 2020 | 19 |
| Av. Particle size (nm) | 91 | 217 | 165 | 137 | 167 | 238 | 63 |

EXAMPLES 12 TO 20

Blends from fluoro vinyl polymers P1 and P5 and the non-fluoro vinyl polymers P9-P15 were prepared according to the ratios listed in Table 7 by blending aqueous emulsions of the polymers together under stirring. The blends were formulated with 3% (on total) Dowanol DPnB (except for Example 14), 0.1 gram Byk 348 and 1.5 SA Bahydur 3100 and cast and dried as described previously and subjected to the anti-graffiti test and the test for resistance towards Petrol, Diesel, Skydrol and DOT3. The ratings are given in Table 7. If necessary some water was added to the blends to control the viscosity increase encountered during the addition of the crosslinker.

TABLE 7

|  | Ex no. | | | | | | | | |
|---|---|---|---|---|---|---|---|---|---|
|  | 12 | 13 | 14 | 15 | 16 | 17 | 18 | 19 | 20 |
| Fluoro polymer | P5 | P5 | P1 | P1 | P5 | P1 | P1 | P7 | P7 |
| Non-fluoro polymer | P9 | P9 | P12 | P10 | P11 | P13 | P9 | P14 | P15 |
| Fluoro/non-fluoro polymer weight ratio | 98/2 | 50/50 | 14/86 | 98/2 | 60/40 | 79/21 | 30/70 | 50/50 | 90/10 |
| Anti-graffiti | 31 | 25 | 20 | 30 | 30 | 23 | 15 | 25 | 29 |
| Resist. To Petrol | 5 | 5 | 5 | 5 | 5 | 5 | 4 | 5 | 5 |
| Resist. To Diesel | 5 | 5 | 5 | 5 | 5 | 3 | 3 | 5 | 5 |
| Resist. To Skydrol | 5 | 4 | 5 | 5 | 5 | 5 | 3 | 5 | 5 |
| Resist. To DOT3 | 5 | 3 | 5 | 5 | 4 | 3 | 3 | 4 | 2 |

Table 7 shows that the blends of fluoropolymers and non-fluoropolymers have good to excellent anti-graffiti properties and resistances against oils, DOT3 and Skydrol.

What is claimed is:

1. Aqueous crosslinkable coating composition suitable for anti-graffiti and heavy duty applications comprising:
    (A) an aqueous polymer emulsion comprising at least one vinyl fluoropolymer in which:
        (i) said at least one vinyl fluoropolymer comprises as a polymerised constituent monomer thereof a fluoromonomer(s) having the formula:

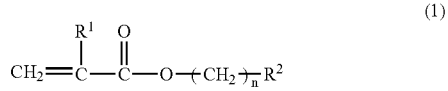
(1)

wherein $R^1$ is $CH_3$ or H, $R^2$ is a perfluorinated $C_{1-5}$ alkyl group and n is 1, 2, 3 or 4, and wherein said fluoromonomer(s) forms from 5 to 60 weight % of the total monomers used to prepare said at least one vinyl fluoropolymer;
        (ii) said at least one vinyl fluoropolymer comprises as a polymerised constituent monomer thereof 2 to 58 weight % of a polymerised non-fluoro, non-acid hydroxyl functional monomer(s) in an amount to provide or contribute to a hydroxyl value, which said at least one vinyl fluoropolymer possesses, of at least 8 mg KOH/g of solid polymer;
        (iii) said at least one vinyl fluoropolymer comprises as a polymerised constituent monomer(s) thereof from 0.2 to 10 weight % of a non-fluoro, non-hydroxy carboxylic acid-functional monomer(s) in an amount to provide or contribute to an acid value, which said at least one vinyl fluoropolymer possesses, of within the range of from 2 to 80 mg KOH/g of solid polymer;
        (iv) wherein said at least one vinyl fluoropolymer comprises as a polymerised constituent monomer(s) 0 to 92 weight % of a non-fluoro, non-acid, non-hydroxyl monomer(s); and
        (v) said at least one vinyl fluoropolymer has a glass transition temperature Tg within the range of from −50 to 90° C.; and
    (B) at least one hydroxyl-reactive crosslinker material;
    wherein said at least one hydroxyl-reactive crosslinker material of component (B) is present in an amount such the ratio of hydroxyl groups from the polymer(s) of component (A) to the hydroxyl-reactive groups of the crosslinker material of component (B) is within the range of from 0.1 to 10, said coating composition providing coatings with anti-graffiti ratings of 30 to 35 against graffiti from seven differently colored markers.

2. Composition according to claim 1 wherein the amount of fluoromonomer(s) of formula (1) used to prepare said at least one fluoropolymer of component (A) is within the range of from 5 to 50 weight % based on the total amount of monomers employed.

3. Composition according to claim 1 wherein the fluoromonomer of formula (1) is 2,2,2-trifluoroethyl methacrylate (TFEMA) or 2,2,2,-trifluoroethyl acrylate (TFEA).

4. Composition according to claim 1 wherein the hydroxyl value of said at least one fluoropolymer of component (A) is within the range of from 20 to 175 mg KOH/g of solid polymer.

5. Composition according to claim 1 wherein said hydroxy functional monomer(s) of (ii) is selected from one or more of 2-hydroxyethyl methacrylate, 2-hydroxyethyl acrylate, 2-hydroxy-n-propyl methacrylate, 2-hydroxy-n-propyl acrylate, 3-hydroxy-n-propyl methacrylate, 3-hydroxy-n-propyl acrylate and 4-hydroxy-n-butyl acrylate.

6. Composition according to claim 1 wherein the acid value of said at least one fluoropolymer of component (A) is within the range of from 4 to 55 mg KOH/g of solid polymer.

7. Composition according to claim 1 wherein said carboxylic acid functional monomer(s) of (iii) is selected from one or more of acrylic acid, methacrylic acid, beta-carboxyethyl acrylate, itaconic acid, crotonic acid, fumaric acid, maleic acid and maleic anhydride.

8. Composition according to claim 1 wherein said non-fluoro, non-hydroxyl, non-acid vinyl monomer(s) of component (A) is selected from one or more esters of acrylic acid and methacrylic acids of formula

wherein $R^4$ is H or methyl and $R^5$ is optionally substituted alkyl of 1 to 20 carbon atoms or cycloalkyl of 5 to 12 ring carbon atoms but which exclude fluorine-containing, acid-containing and hydroxy containing groups; styrene; and α-methyl styrene.

9. Composition according to claim 1 wherein said at least one vinyl fluoropolymer of component (A) is made using an aqueous emulsion polymerisation process.

10. Composition according to claim 1 wherein the Tg of said at least one vinyl fluoropolymer of component (A) is within the range of from 0 to 60° C.

11. Composition according to claim 1 wherein the average particle size of said at least one vinyl fluoropolymer of component (A) is within the range of from 20 to 500 nm.

12. Composition according to claim 1 wherein the weight average molecular weight of said at least one vinyl fluoropolymer of component (A) is within the range of from 5,000 to 5,000,000 Daltons.

13. Composition according to claim 1 wherein said at least one hydroxyl-reactive crosslinker material(s) of component (B) is selected from organic polyisocyanates, organic blocked polyisocyanates, organic isothiocyanates and melamine-based resins.

14. Composition according to claim 1 wherein the aqueous polymer emulsion of component (A) further comprises a non-fluoropolymer(s).

15. Composition according to claim 14 wherein said non-fluoropolymer is hydroxyl-functional.

16. Composition according to claim 14 wherein said non-fluoropolymer is acid-functional.

17. Composition according to claim 14 wherein said non-fluoropolymer(s) has an average particle size within the range of from 30 to 600 nm.

18. Aqueous crosslinkable coating composition suitable for anti-graffiti and heavy duty applications comprising:
    (A) an aqueous polymer emulsion comprising at least one vinyl fluoropolymer in which:
        (i) said at least one vinyl fluoropolymer comprises as a polymerised constituent monomer thereof a fluoromonomer(s) having the formula:

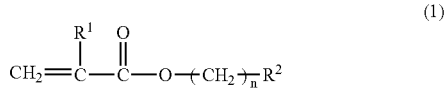

wherein $R^1$ is $CH_3$ or H, $R^2$ is a perfluorinated $C_{1-5}$ alkyl group and n is 1, 2, 3 or 4, and wherein said fluoromonomer(s) forms from 5 to 60 weight % of the total monomers used to prepare said at least one vinyl fluoropolymer;

(ii) said at least one vinyl fluoropolymer comprises as a polymerised constituent monomer thereof a polymerised hydroxyl functional monomer(s) in an amount to provide or contribute to a hydroxyl value, which said at least one vinyl fluoropolymer possesses, of at least 8 mg KOH/g of solid polymer;

(iii) said at least one vinyl fluoropolymer comprises as a polymerised constituent monomer(s) thereof a carboxylic acid-functional monomer(s) in an amount to provide or contribute to an acid value, which said at least one vinyl fluoropolymer possesses, of within the range of from 2 to 80 mg KOH/g of solid polymer;

(iv) said at least one vinyl fluoropolymer has a glass transition temperature Tg within the range of from −50 to 90° C.; and (B) at least one hydroxyl-reactive crosslinker material;

wherein said at least one hydroxyl-reactive crosslinker material of component (B) is present in an amount such the ratio of hydroxyl groups from the polymer(s) of component (A) to the hydroxyl-reactive groups of the crosslinker material of component (B) is within the range of from 0.1 to 10 wherein said aqueous polymer emulsion of component (A) further comprises a non-fluoro polymer(s) and wherein said fluoro polymer(s) has an average particle size which is smaller than that of the non-fluoropolymer(s) by at least 10 nm.

19. Composition according to claim 14 wherein the Tg of the non-fluoropolymer(s) is in the range of from −50 to 90° C.

20. Composition according claim 14 wherein said non-fluoropolymer(s) of component (A) is derived from a monomer system which comprises 32 to 100 weight % of a non-fluoro, non-acid, non-hydroxyl monomer(s); 0 to 58 weight % of a non-fluoro, non-acid, hydroxyl functional monomer(s) and 0 to 10 weight % of a non-fluoro, non-hydroxy, carboxylic acid-functional monomer(s) wherein all weight % values are based on the total weight of monomers used for the polymerisation.

21. Composition according to claim 14 wherein the weight ratio of fluoropolymer(s)/non-fluoropolymer(s) is within the range of from 99/1 to 10/90.

22. Method of coating a substrate which comprises applying a coating composition according to claim 1 to a substrate, causing or allowing the aqueous carrier medium of the composition to be removed, and developing crosslinking of the coating that has been applied to the substrate.

23. A crosslinked coating derived from a coating composition according to claim 1.

24. Coated substrate which has been prepared using a method according to claim 22.

25. Aqueous crosslinkable coating composition suitable for anti-graffiti and heavy duty applications comprising:

(A) an aqueous polymer emulsion comprising at least one vinyl fluoropolymer in which:

(i) said at least one vinyl fluoropolymer comprises as a polymerised constituent monomer thereof a fluoromonomer(s) having the formula:

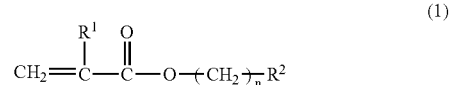

wherein $R^1$ is $CH_3$ or H, $R^2$ is a perfluorinated $C_{1-5}$ alkyl group and n is 1, 2, 3 or 4, and wherein said fluoromonomer(s) forms from 5 to 60 weight % of the total monomers used to prepare said at least one vinyl fluoropolymer;

(ii) said at least one vinyl fluoropolymer comprises as a polymerised constituent monomer thereof 2 to 58 weight % of a polymerised non-fluoro, non-acid hydroxyl functional monomer(s) in an amount to provide or contribute to a hydroxyl value, which said at least one vinyl fluoropolymer possesses, of at least 8 mg KOH/g of solid polymer;

(iii) said at least one vinyl fluoropolymer comprises as a polymerised constituent monomer(s) thereof from 0.2 to 10 weight % of a non-fluoro, non-hydroxy carboxylic acid-functional monomer(s) in an amount to provide or contribute to an acid value, which said at least one vinyl fluoropolymer possesses, of within the range of from 2 to 80 mg KOH/g of solid polymer;

(iv) wherein said at least one vinyl fluoropolymer comprises as a polymerised constituent monomer(s) 0 to 92 weight % of a non-fluoro, non-acid, non-hydroxyl monomer(s); and (v) said at least one vinyl fluoropolymer has a glass transition temperature Tg within the range of from −50 to 90° C.; and (B) at least one hydroxyl-reactive crosslinker material;

wherein said aqueous polymer emulsion (A) also includes a non-fluoropolymer(s) comprising:

32 to 100 weight % of a non-fluoro, non-acid, non-hydroxyl monomer 0 to 58 weight % of a non-fluoro, non-acid, hydroxyl functional monomer and 0 to 10 weight % of a non-fluoro, non-hydroxyl, carboxylic acid functional monomer.

* * * * *